(12) United States Patent  (10) Patent No.: US 6,509,668 B2
Berger  (45) Date of Patent: Jan. 21, 2003

(54) ELECTRIC MOTOR, IN PARTICULAR FOR HAND POWER TOOLS

(75) Inventor: Guenther Berger, Notzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/751,987

(22) Filed: Dec. 29, 2000

(65) Prior Publication Data

US 2001/0006316 A1 Jul. 5, 2001

(30) Foreign Application Priority Data

Dec. 30, 1999 (DE) .......................... 199 64 061

(51) Int. Cl.[7] .............. H02K 1/22; H02K 5/00; H02K 1/04; H02K 7/10
(52) U.S. Cl. .................. 310/261; 310/89; 310/43; 310/75 D
(58) Field of Search .................. 310/261, 43, 45, 310/90, 89, 214, 215, 50, 75 D

(56) References Cited

U.S. PATENT DOCUMENTS 4,663,835 A * 5/1987 Caillier .................. 29/598
5,644,180 A * 7/1997 Buchanan .................. 310/90

FOREIGN PATENT DOCUMENTS

| EP | 0 240 670 A2 | 10/1987 |
|---|---|---|
| EP | 0 387 666 A1 | 9/1990 |
| GB | 386931 | 1/1933 |
| GB | 1093419 | 11/1967 |
| GB | 1487236 | 9/1977 |
| GB | 2290914 A | 1/1996 |
| WO | 97/20377 | 6/1997 |
| WO | 97/35375 | 9/1997 |

* cited by examiner

Primary Examiner—Thanh Lam
(74) Attorney, Agent, or Firm—Michael J. Striker

(57) ABSTRACT

An electric motor for hand power tools has a rotor shaft, a rotor provided with a metal plate pack which is rotatably supported and non rotatably connected with the rotor shaft, the metal plate pack having a plurality of grooves which are spaced from one another in a peripheral direction and provided with a coating of insulating material, a rotor winding received in the grooves provided with the groove coating, the metal plate pack having an end plate composed of insulating material and arranged at each end side of the metal plate pack, the groove coatings and the end plates together with the rotor shaft as shaft ends axially projecting from the end plates being formed as synthetic plastic parts produced by an injection molding.

4 Claims, 2 Drawing Sheets

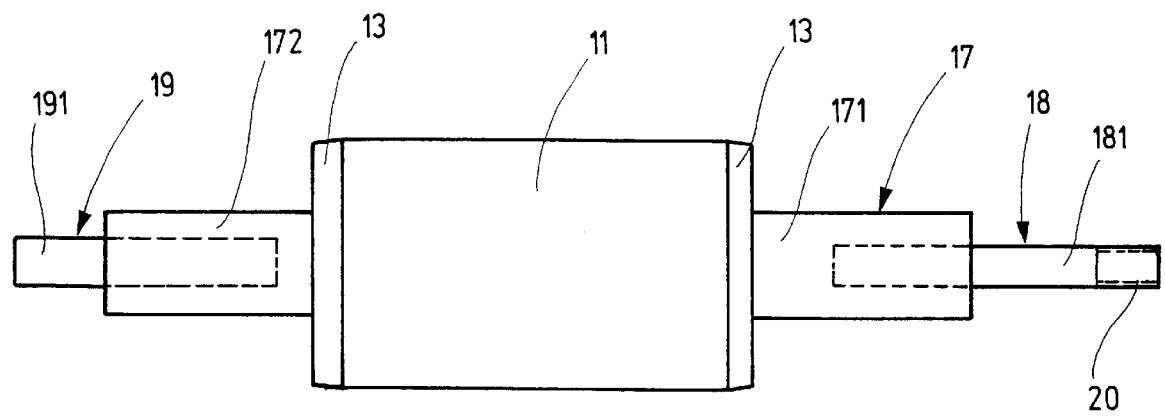
Fig.1
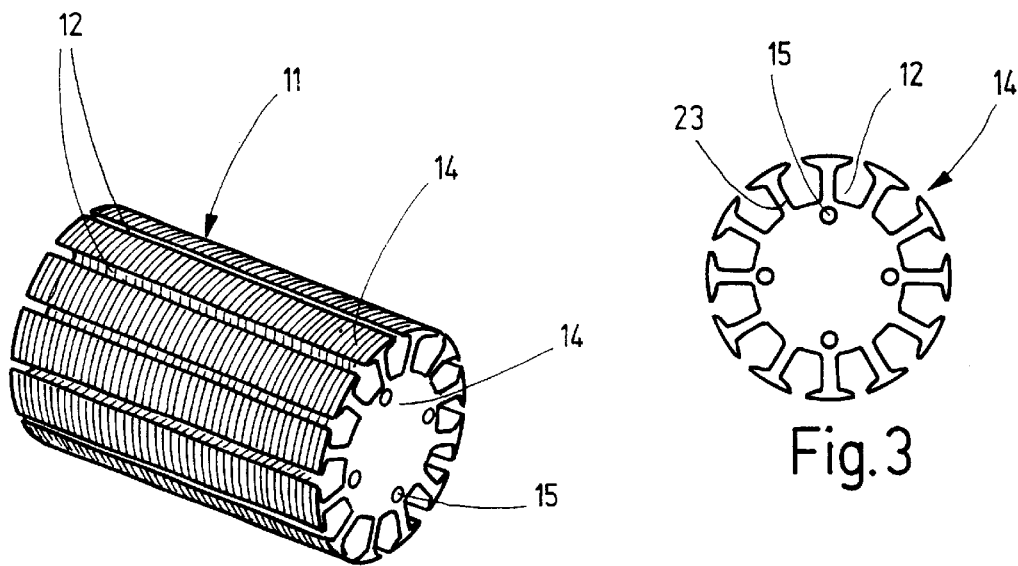
Fig.2
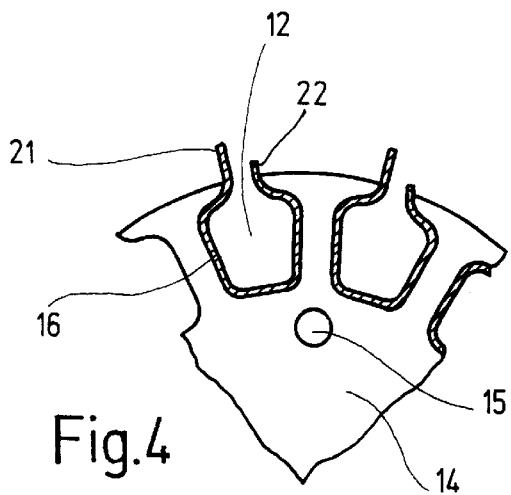
Fig.3
Fig.4

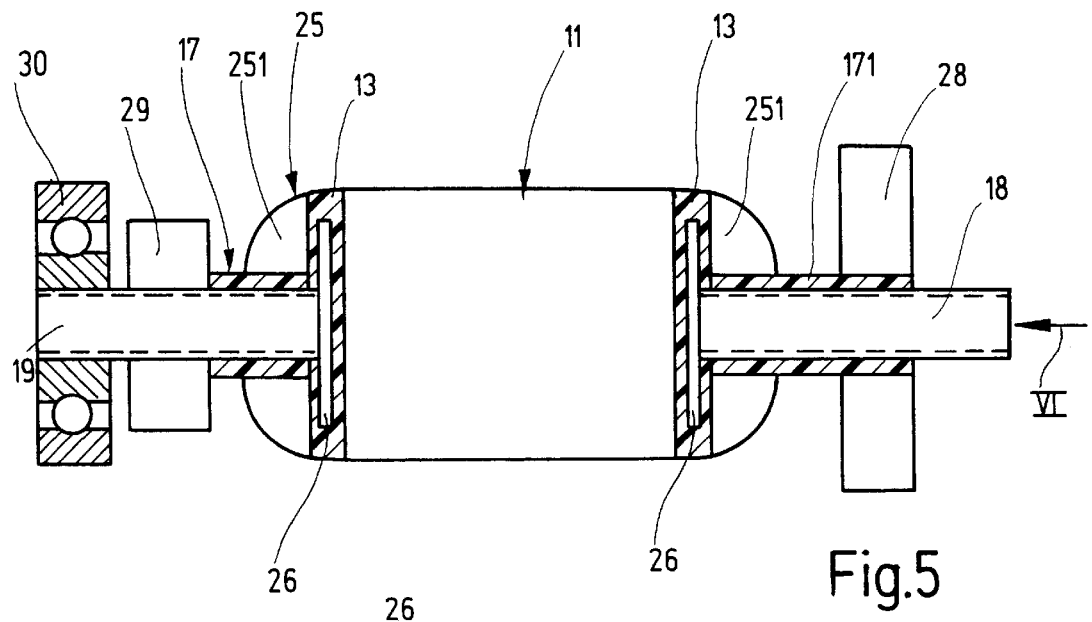
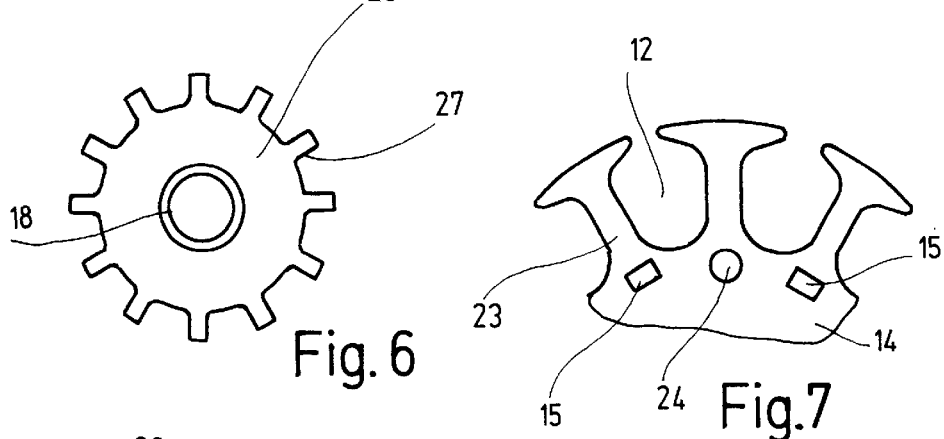
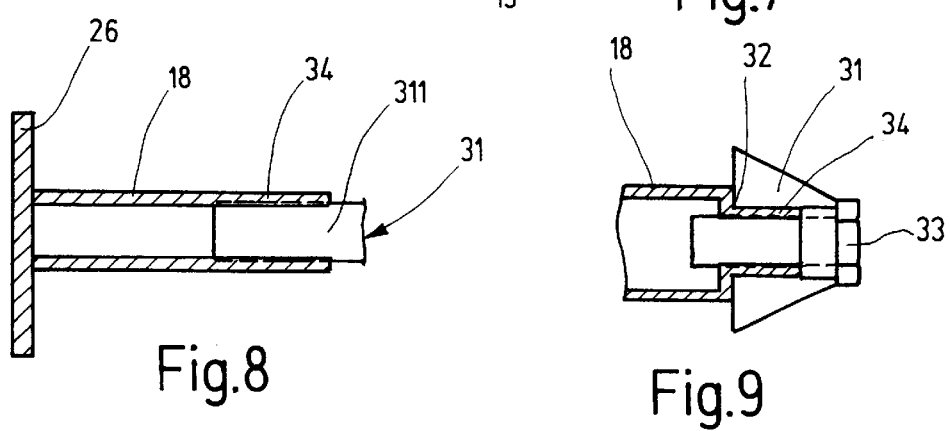

ELECTRIC MOTOR, IN PARTICULAR FOR HAND POWER TOOLS

BACKGROUND OF THE INVENTION

The present invention relates to an electric motor, in particular for hand powered tools.

In a known electric motor of this type, a central shaft opening is punched in a metal plate pack of the rotor or the stator, and the metal plate pack with the end plates of insulating material is fitted on the rotor shaft so that, at both sides of the plate pack the rotor shaft extends axially outwardly with a corresponding shaft portion. Bearing seats for receiving a rotary bearing are formed on the shaft portions, and a pinion for the torque transmission is fixed on one shaft portion. The connection between metal plate pack and the rotor shaft is produced by a plastic injection molding process. Simultaneously a plastic longitudinal insulation between the rotor shaft and the metal plate pack is produced. In the event of failure, it must prevent a voltage propagation from the rotor winding to the outwardly located, contacting components. The synthetic plastic longitudinal insulation must have a certain thickness because of the corresponding regulations and safety reasons, and must maintain the required testing voltage. For avoiding a voltage propagation by strong dirtying in the bearing region, and also in the event of failure of a commutator, through the armature shaft and the bearing outwardly, a labyrinth disk is applied on the longitudinal insulation for creep resistance and distance increase. The grooves in the plate pack for receiving the rotor winding are coated with press board and are closed and impregnated after the winding with the pressed board.

SUMMARY OF THE INVENTION

Accordingly, it is an object of the present invention to provide an electric motor, in particular for hand powered tools which avoids the disadvantages of the prior art.

In keeping with these objects and with others which will become apparent hereinafter, one feature of present invention resides, briefly stated, in an electric motor in which the groove coatings and the end plates as well as the rotor shaft with the shaft are injection molded in an injection molding process from synthetic plastic.

When the electric motor is designed in accordance with the present invention, it has the advantage that on the one hand the production of the motor is substantially simplified, and on the other hand, a voltage propagation outwardly in the event of failure is reliably prevented without additional measures. Since the shaft opening is absent and the longitudinal insulation is absent, the magnetic flux in the iron cross-section is hindered substantially less and the remagnetization losses which are produced in a conventional electrical machines by high backload and frequency in back iron are substantially reduced. The idling speed of the rotor is lowered and thereby the winding design in the loading point can be improved. With the new cross-sectional design of the metal plates, the field diameter of the rotor with the same power can be reduced. By complete synthetic plastic coating of the metal plate pack, the danger of a wire damage during winding process of the rotor winding is lowered. Since the rotor must withstand high temperatures during overloads, a high temperature resistant synthetic plastic or a duroplastic can be utilized.

In accordance with a preferable embodiment of the invention, a plurality of longitudinal throughgoing axial openings can be provided in the plates, for filling the synthetic plastic during the injection molding process. Preferably, the openings are arranged on web feet between the grooves and alternate with the depression for the punch acting, so that in the peripheral region of the metal plate pack, each depressions follows an opening and vice versa.

In accordance with a preferable embodiment of the present invention, the rotor winding which is inserted in the grooves of the metal plate pack surrounds its winding heads which project over the end side of the metal plate pack, the end plates and the shaft end and is coated in a dipping or impregnating process. With this structural design, a very high stability of the rotor is obtained which is required for high rotary speeds. The winding heads additionally contribute to the stabilitation of the armature plate pack and the dipping or impregnation of the rotor winding makes possible glueing and backing of the winding heads, and plates end shaft ends, which together advantageously influences the strength of the rotor.

In accordance with a preferable embodiment of the invention, a bearing pin for example of steel is injection molded in at least one shaft end, as an insert aligned with the shaft end. A rotary bearing, in particular a ball bearing and/or a collector is non rotatably received on the pin part which freely projects from the shaft end. The rotary bearing and the collector are preferably pressed on the bearing pin. A danger of the breakthrough of the voltage to the bearing pin and thereby a voltage propagation to the outwardly located components which are accessible for contacting by a user, does not take place in this case.

In accordance with a preferable embodiment of the present invention, at least one bearing pin extends up to the metal plate pack and is firmly connected at an end side with an anchoring disk which is enclosed in the end plate. For weight reduction, hollow bearing pins and anchoring disks can be formed as one piece deep drawn parts. The anchoring disk is provided on its disk periphery with a circumferential set of teeth, in order to improve adherence in synthetic plastic and thereby to provide greater safety against relative movement of the bearing pin and the metal plates.

In accordance with a preferable embodiment of the present invention a pin part of the bearing pin which projects in the end portion outwardly beyond the shaft end has an outer or inner thread for outer or inner screwing of a drive pinion or a drive gear. Alternatively a pinion end is injection molded in the shaft end as an insert which is in alignment with the shaft end. The pinion end with its pinion teeth freely projects outwardly from the shaft end. Bearing pins or pinion ends are inserted during the injection molding process in the mold and injected from synthetic plastic of the shaft end.

In accordance with a preferable embodiment of the invention, the grooves which are formed in the synthetic plastic layer are provided with a groove closure. The groove closures are injection molded in the injection molding process as a film hinge on the groove coating. During the injection molding process the region of the groove lock serves in synthetic plastic filling process for producing the groove coating. The groove locks produced at the end of the filling process are folded after insertion of the rotor winding over the groove openings. Tooth strips which are formed in an opposite groove flank and produced also during the injection molding process, are arrested in a zipper-like manner and secure the rotor winding in the grooves.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic side view of a rotor for an electric motor in accordance with the present invention;

FIG. 2 is a perspective view of a metal plate pack of the rotor of FIG. 1;

FIG. 3 is a plan view of a metal plate of the metal plate pack of FIG. 2;

FIG. 4 is a view showing the section of the metal plate of FIG. 3 on an enlarged scale;

FIG. 5 is a substantially schematic longitudinal section of a rotor for a commutator motor in accordance with a further embodiment of the present invention;

FIG. 6 is a view of a bearing pin with an anchoring disk of the rotor as seen in direction of the arrow VI in FIG. 5;

FIG. 7 is a view showing a section of a metal plate of the rotor of FIG. 5, on an enlarged scale;

FIG. 8 is a partial longitudinal section of a bearing pin with an anchoring disk and a drive pinion screwed at its end side; and FIG. 9 is a partial longitudinal section of a bearing pin with a drive pin having a center opening fitted onto the bearing pin, the pin end having a stepped form.

DESCRIPTION OF THE PREFERRED EMBODIMENTS

FIG. 1 on aside view shows a rotor of an electric motor which conventionally is composed of a stator and a rotor and used preferably for hand power tools. The rotor has a metal plate pack 11 provided with grooves 12 which are shown in FIG. 2 and spaced from one another by an equal peripheral angle. The metal plate pack 11 is closed at each end side with an end plate 13 composed of insulating material. The metal plate pack 11 which is shown in a perspective in FIG. 2 is assembled of a plurality of metal plates 14. They are produced in a punching cut and connected by punch packeting with one another to form the metal plate pack 11. One metal plate 14 is shown in FIG. 3. For punch packeting, each metal plate 14 has four depressions 15 which are offset relative to one another by peripheral angle of 90°. They are located directly under a web 23 which remains between the grooves 12.

The rotor winding of varnish-insulated wire is introduced in a not shown manner into the grooves 12 during a winding process. For improving the insulation of the rotor winding from the metal plate pack 11, the grooves 12 are provided with a groove coating 16 of insulating material as shown on an enlarge scale in FIG. 4. The metal plate pack 11 is rotatably supported by a bearing pin, the bearing pin being non rotatably connected with a rotor shaft 17, which is rotatably supported in a stator of the electrical machine in the known manner.

In the rotor shown in FIG. 1, the groove coating 16 and the grooves 12, the both end plates 13 and the rotor shaft 17 as the shaft ends 171 and 172 axially projecting from the end plates 13 are injection molded of synthetic plastic in a joint injection molding process. A bearing pin 18 or 19 is injection molded from steel for each shaft end 171, 172 as an insert which is in alignment with the shaft end 171 or 172. For this purpose both bearing pins 18, 19 during the injection molding process are inserted in the injection mold and enclosed by synthetic plastic of the shaft end 171, 172. A bearing seat for a rotary bearing is formed on each pin part 181 or 191 of the bearing pin 18 or 19, which freely projects outwardly beyond the shaft end 171 or 172.

A thread 20 for screwing of a driven pinion for torque transmission is cut in the end portion of the pin part 181. In the case of the electrical machine formed as a commutator motor, a commutator is fitted on the shaft end 172 and in a known manner is connected to the rotor windings. As can be seen from FIG. 4, the grooves in the metal plate pack 11 are closed after insertion of the rotor winding, by a groove closure 21. The groove closure 21 is injection molded during the injection molding process of the groove coating 16, the end plates 13, and the shaft ends 171, 172, as a film hinge on the groove coating 16 in each groove 12. After insertion of the rotor winding, the groove closures 21 are folded by 90° and arrested at the opposite groove side in an available toothed strip 22 which is also injection molded, in form of a friction lock.

In an alternative embodiment of the invention, instead of the injection molding of the bearing pin 18 in the shaft end 171, a pinion end is injection molded as an insert which is in alignment with the shaft end 171. This pinion end projects with its pinion teeth outwardly beyond the shaft end 171 and makes unnecessary the thread 20 on the bearing pin 18 and subsequent screwing of a pinion on the thread 20 as can be seen from FIG. 1. As the bearing pin 181, also the pinion end can be introduced during the injection molding process into the injection mold and thereby injection molded from the synthetic plastic of the shaft end 171.

In a further alternative embodiment of the invention, the bearing pin 191 which is injection molded in the shaft end 172 is not formed as a steel insert. Instead, the bearing pin is injection molded of one piece with the shaft end 172. This is possible when the bearing pin is fitted over a ball bearing in the stator and the inner ring of the ball bearing is non rotatably arranged on the injection molded bearing pin.

FIGS. 5–8 show a further embodiment of a rotor for an electric motor, here a commutator motor. Here also the groove coatings are injection molded in the grooves 12 of the plate pack 11, end plates 13 and the shaft ends 171, 172 which form the rotor shaft 17, in an injection molding process and from synthetic plastic. The metal plate pack 11 is also assembled from the metal plates 14 by punch packeting, and for this purpose depressed depressions 15 are provided on each metal plate 14 and offset relative to one another by the same peripheral angle. As shown in FIG. 7, the depressions 15 are arranged directly under a web 23 which remains between the grooves 12, and the depressions 15 are associated with each second web 23. For improving the stability of the metal plate pack 11, all metal plates 14 are provided with openings 24 which are offset relative to one another by the same peripheral angle. They are also located directly under a web 23 which remains between the grooves 12. Since the openings 24 are associated with each second web 23, one depression 15 always alternates with one opening 24 in the peripheral direction of the metal plates 14 as can be seen from FIG. 7.

After punch packeting longitudinal openings which are assembled from the openings 24 and arranged in alignment with one another completely extend through the metal plate pack 11. During the injection molding process of the end plates 13, the shaft ends 171, 172 and the not shown groove coatings these longitudinal openings are completely filled with synthetic plastic due to flow properties of the synthetic plastic. The rotor winding 25 which similarly to the embodiment of FIGS. 1–4 is inserted in the grooves 12 provided with the groove coatings and groove locks, surrounds the end plates 13 and the shaft ends 171, 172 with the winding heads 251 which extend outwardly beyond the end sides of the metal plate pack 14 or in other words the end plates 13.

The rotor winding 25 is coated in a dipping or impregnating process. Thereby the winding heads 251 are additionally baked with the end plates 13 and the shaft ends 171, 172, so that as a whole the strength of the rotor is further increased.

The bearing pins 18, 19 are also injection molded in the shaft ends 171, 172. However, the bearing pins 171, 172 extend up to the metal plate pack 11 and are firmly connected at one end side with the anchoring disk 26 which is locked in the corresponding end plate 13. The anchoring disk 26 which is shown in a plan view in FIG. 6 is provided on its periphery with a set of teeth 27 for an improved adherence with the synthetic plastic of the end plate 17. This reliably prevents a turning of the bearing pin 18 or 19 in the shaft end 171 or 172 under the action of high torques applied to the bearing pins 18, 19. The bearing pins 18, 19 which are formed here hollow, together with the anchoring disk 26 are produced as deep drawn parts and injection molded during injection molding process as inserts. In the embodiment of FIG. 5 an impeller 20 of a fan which serves for cooling of the electric motor is arranged on the shaft end 171. A commutator 29 and a ball bearing 30 for supporting the rotor in the stator are pressed on the bearing pin 19 which projects outwardly beyond the shaft end 172.

As can be seen from FIG. 8, an inner thread 34 is formed in the hollow bearing pin 18, and a drive pinion 31 with an axial end 311 is screwed in it. Alternatively, as shown in FIG. 9, a drive pin 31 provided with a center opening can be fitted on the bearing pin 18. For this purpose the pin end is stepped, for forming an abutment shoulder 32 of a different diameter. The drive pinion 31 which abuts against the abutment shoulder 32 is clamped against the abutment shoulder 32 by a clamping screw 33. screwed into the inner thread 34 in the bearing pin 18.

It will be understood that each of the elements described above, or two or more together, may also find a useful application in other types of constructions differing from the types described above.

While the invention has been illustrated and described as embodied in electric motor, in particular for hand power tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electric motor for hand power tools, comprising a rotor including a metal plate pack nonrotatably mounted on a rotor shaft, said rotor being rotatably supported by at least one bearing pin, said at least one bearing pin being nonrotatably connected with said rotor shaft, said metal plate pack having a plurality of grooves which are spaced from one another in a peripheral direction and provided with a groove coating of insulating material; a rotor winding received in said grooves provided with said groove coating, said metal plate pack having end plates composed of insulating material, said end plates being arranged on opposite end sides of said metal plate pack, wherein said groove coatings, said end plates and shaft ends of said rotor shaft axially projecting from said end plates are synthetic plastic parts produced by injection molding, wherein said at least one bearing pin is hollow, is injection molded in at least one of said shaft ends as an insert in alignment with said shaft ends, and has a respective pin part, which freely projects from said at least one of said shaft ends and is formed for receiving an additional element.

2. An electric motor for hand power tools, comprising a rotor including a metal plate pack nonrotatably mounted on a rotor shaft, said rotor being rotatably supported by at least one bearing pin, said at least one bearing pin being nonrotatably connected with said rotor shaft, said metal plate pack having a plurality of grooves which are spaced from one another in a peripheral direction and provided with a groove coating of insulating material; a rotor winding received in said grooves provided with said groove coating, said metal plate pack having end plates composed of insulating material, said end plates being arranged on opposite end sides of said metal plate pack, wherein said groove coatings, said end plates and shaft ends of said rotor shaft axially projecting from said end plates are synthetic plastic parts produced by injection molding, wherein said at least one bearing pin is injection molded in at least one of said shaft ends as an insert in alignment with said shaft ends, and has a respective pin part freely projecting from said at least one of said shaft ends and formed for receiving an additional element, wherein said at least one bearing pin extends up to said plate metal pack, and wherein at least one anchoring disk is provided, said at least one anchoring disk is fixedly connected with said at least one bearing pin at an end side of the bearing pin and enclosed in one of said end plates.

3. An electric motor for hand power tools, comprising a rotor including a metal plate pack nonrotatably mounted on a rotor shaft, said rotor being rotatably supported by at least one bearing pin, said at least one bearing pin being nonrotatably connected with said rotor shaft, said metal plate pack having a plurality of grooves which are spaced from one another in a peripheral direction and provided with a groove coating of insulating material; a rotor winding received in said grooves provided with said groove coating, said metal plate pack having end plates composed of insulating material, said end plates being arranged on opposite end sides of said metal plate pack, wherein said groove coatings, said end plates and shaft ends of said rotor shaft axially projecting from said end plates are formed as synthetic plastic parts produced by injection molding, wherein said at least one bearing pin is injection molded in at least one of said shaft ends as an insert in alignment with said shaft ends and has a respective pin part freely projecting from said at least one of said shaft ends and formed for receiving an additional element, wherein said at least one bearing pin extends up to said plate metal pack, and wherein at least one anchoring disk is enclosed in one of said end plates and fixedly connected with said at least one bearing pin at an end side of the at least one bearing pin, wherein said at least one anchoring disk is provided with a set of peripheral teeth.

4. An electric motor for hand power tools, comprising a rotor including a metal plate pack nonrotatably mounted on a rotor shaft, said rotor being rotatably supported by at least one bearing pin, said at least one bearing pin being nonrotatably connected with said rotor shaft, said metal plate pack having a plurality of grooves which are spaced from one another in a peripheral direction and provided with a groove coating of insulating material; a rotor winding received in said grooves provided with said groove coating, said metal plate pack having end plates composed of Insulating material, said end plates being arranged on opposite end sides of said metal plate pack, wherein said groove coatings, said end plates and shaft ends of said rotor shaft axially projecting from said end plates are formed as synthetic plastic parts produced by injection molding, wherein said at least one bearing pin is injection molded in at least one of said shaft ends as an insert in alignment with said shaft ends and has a respective pin part that extends from said at least one of said shaft ends and is formed for receiving an additional element, wherein said pin part has an end portion provided with a thread and a drive pinion screwed on said thread of said end portion, wherein said at least one bearing pin has an abutment shoulder and said drive pinion is clamped against said abutment shoulder of said at least one bearing pin by a clamping screw, wherein said at least one bearing pin is at least partially hollow and provided with an inner thread and said clamping screw is screwed into said inner thread.

* * * * *